US012105985B2

(12) United States Patent
Giannopoulos et al.

(10) Patent No.: US 12,105,985 B2
(45) Date of Patent: Oct. 1, 2024

(54) PROCESSING DATA IN-MEMORY WITH MEMORY DEVICES HAVING A CROSSBAR ARRAY STRUCTURE

(71) Applicant: International Business Machines Corporation, Armonk, NY (US)

(72) Inventors: Iason Giannopoulos, Thalwil (CH); Navaneeth Rameshan, Zurich (CH); Vara Sudananda Prasad Jonnalagadda, Wallisellen (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 17/655,634

(22) Filed: Mar. 21, 2022

(65) Prior Publication Data
US 2023/0297268 A1  Sep. 21, 2023

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0604; G06F 3/0655; G06F 3/0679; G11C 7/1006; G11C 7/24; G11C 13/004; G11C 13/0059; H04L 9/0631
See application file for complete search history.

(56) References Cited

U.S. PATENT DOCUMENTS

| 11,145,349 | B1 | 10/2021 | Pawlak |
| 2016/0306750 | A1 | 10/2016 | Tucker |
| 2017/0039080 | A1* | 2/2017 | Chadha ............... G06F 9/45558 |
| 2019/0042402 | A1 | 2/2019 | Chhabra |

(Continued)

FOREIGN PATENT DOCUMENTS

| TW | 202026931 A | 7/2020 |
| WO | 2023180830 A1 | 9/2023 |

OTHER PUBLICATIONS

Angizi et al., "Hybrid Spin-CMOS Polymorphic Logic Gate With Application in In-Memory Computing", IEEE Transactions On Magnetics, vol. 56, No. 2, Feb. 2020, 15 pages.

(Continued)

*Primary Examiner* — Larry T Mackall
(74) *Attorney, Agent, or Firm* — Michael A. Petrocelli

(57) ABSTRACT

The invention is notably directed to a method of processing data in-memory. The method applies electrical signals to at least two input lines, which correspond to at least two rows. These two rows include at least one of the K rows and at least one of the L rows. This causes to obtain output signals in output of the M output lines, wherein the output signals depend on target values and operand values, in accordance with data stored across at least two rows. Finally, the output signals are read out and a transformation operation is concurrently performed, in-memory, on the target values based on the operand values. This way transformed data are obtained by way of in-memory processing. The transformation may for instance be a cryptographic operation; the operand data may encode a cryptographic key. The invention is further directed to related apparatuses and systems, notably cryptographic service systems.

25 Claims, 8 Drawing Sheets

(56) References Cited

U.S. PATENT DOCUMENTS

2019/0386814 A1 12/2019 Ahmed
2020/0320020 A1 10/2020 Lea
2021/0319300 A1* 10/2021 Joshi .................... G11C 13/004
2022/0012329 A1 1/2022 Boling

OTHER PUBLICATIONS

International Search Report, International Application No. PCT/IB2023/051518, International Filing Date Feb. 20, 2023, 9 pages.

Parveen et al., "IMFlexCom: Energy Efficient In-Memory Flexible Computing Using Dual-Mode SOT-MRAM", ACM Journal on Emerging Technologies in Computing Systems, vol. 14, No. 3, Article 35. Pub. date: Oct. 2018, 18 pages.

Sebastian et al., "Memory devices and applications for in-memory computing", Nature Nanotechnology, vol. 15, No. 7, Published: Mar. 30, 2020, Abstract Only, pp. 529-544.

Giannopoulos et al., "8-bit Precision In-Memory Multiplication with Projected Phase-Change Memory", © 2018 IEEE, 4 pages.

Giannopoulos et al., "In-Memory Database Query", © 2020, DOI: 10.1002/aisy.202000141, 12 pages.

Hamdioui et al., "Applications of Computation-In-Memory Architectures based on Memristive Devices", Dec. 11. 2018, Publication Date 2019, 9 pages.

Koelmans et al., "Projected phase-change memory devices", Published Sep. 3, 2015, DOI: 10.1038/ncomms9181, 7 pages.

* cited by examiner

Encryption

| | 1 | 1 | 0 | 0 | 0 | 0 | 1 | 1 | plain |
|---|---|---|---|---|---|---|---|---|---|
| ⊕ | 1 | 0 | 0 | 1 | 0 | 1 | 1 | 0 | key |
| = | 0 | 1 | 0 | 1 | 0 | 1 | 0 | 1 | cipher |

FIG. 3A

Decryption

| | 0 | 1 | 0 | 1 | 0 | 1 | 0 | 1 | cipher |
|---|---|---|---|---|---|---|---|---|---|
| ⊕ | 1 | 0 | 0 | 1 | 0 | 1 | 1 | 0 | key |
| = | 1 | 1 | 0 | 0 | 0 | 0 | 1 | 1 | plain |

FIG. 3B

PROCESSING DATA IN-MEMORY WITH MEMORY DEVICES HAVING A CROSSBAR ARRAY STRUCTURE

BACKGROUND

The present invention relates generally to the field of apparatuses, systems, and methods of processing data in-memory, using memory devices having a crossbar array structure. In particular, embodiments of the present invention are directed to methods exploiting the crossbar array structure of the memory devices to perform a cryptographic operation upon reading out the data, based on a cryptographic key that is securely generated and stored in the crossbar array structure.

Conventional approaches to systematic transformations of large amounts of data stored in memory require massive data movements and suffer from the so-called von Neumann bottleneck. This is notably true for encryption and decryption of data. In addition, such approaches rely on potentially insecure data channels (memory-to-processor).

That is, when using a conventional computer for encryption or decryption, data is moved from memory to a processing unit to perform the cryptographic task. Shuttling data back and forth between the processing and memory units is costly in terms of both energy and time. Moreover, the cryptographic key used to perform this operation has to be moved to the processing unit, leading to a vulnerability, as insecure data channels (from memory to processor) are prone to malicious attacks. More generally, the same problem is observed whenever systematic transformations of large amounts of data are required. Thus, new methodologies are needed.

In-memory processing of data stored in memory is an emerging technology that addresses the performance and power bottlenecks caused by such data movements between processor and main memory. However, security is a concern, because in-memory techniques typically expose large amounts of data to end users. So far, the usual solution to such a security problem is to make sure that only authorized persons have access to the data. Such an approach, however, is not sustainable in the long run.

SUMMARY

According to a first aspect, the present invention is embodied as a method of processing data in-memory. The method relies on a memory device, which has a crossbar array structure. The memory device includes N input lines and M output lines, which are arranged in N rows and M columns. The rows and columns are interconnected at crosspoints defining N×M cells. The cells include respective memory elements, such as resistive memory elements. Thus, the crossbar array structure includes a set of N×M memory elements. The latter decompose into a first subset of K×M memory elements and a second subset of L×M memory elements, in accordance with a first subset of K rows and a second subset of L rows of the N rows, respectively. The numbers N, M, K, and L are subject to the following constraints: $N \geq 2$, $M \geq 2$, $1 \leq L < M$, and $K+L=N$. According to the proposed method, target data are stored across the first subset of K×M memory elements, whereas operand data are stored across the second subset of L×M memory elements. The method applies electrical signals to at least two input lines, which correspond to at least two rows. These two rows include at least one of the K rows and at least one of the L rows. This causes to obtain output signals in output of the M output lines, wherein the output signals depend on target values and operand values, in accordance with data stored across said at least two rows. Finally, the output signals are read out and a transformation operation is concurrently performed, in-memory, on the target values based on the operand values. This way transformed data are obtained by way of in-memory processing.

Operating a crossbar array structure requires very low power, compared with conventional memory devices. Moreover, the final transformation is performed as part of the readout operation (i.e., while reading out the output signals), without incurring additional time and computational costs. In other words, the transformation comes essentially "for free", which is advantageous where systematic transformations have to be performed. The present approach can be used for any type of transformations. For example, this can be used to scale the data stored in the memory device or somehow change their output representations. Of particular advantage is to perform cryptographic transformations, e.g., to encrypt or decrypt the data, or to generate cryptographic keys.

In embodiments, the memory device comprises a readout circuitry in output of the output lines. The output signals are read out by the readout circuitry and the transformation operation is concurrently performed at the readout circuitry, while reading out the output signals.

Preferably, the readout circuitry comprises an array of sense amplifiers with adjustable input threshold levels, where each sense amplifier of the array is connected in output of a respective one of the output lines. The method further comprises adjusting the threshold levels of the sense amplifiers for the latter to implement logical operations involves in the transformation operation.

Of particular advantage is to apply the above approach to cryptographic operations. For instance, the operand data may encode a cryptographic key, whereby the operand values are cryptographic values. The transformation operation is a cryptographic operation, which is based on the cryptographic key. In particular, each of the logical operations may include one of an XOR operation, a logical AND operation, and a logical OR operation. For instance, each of the logical operations may consist of a bitwise XOR operation based on respective one of the target values and a corresponding one of the cryptographic values.

In embodiments, the method further comprises performing one or more further operations based on the transformed data, thanks to a near-memory computation unit connected in output of the readout circuitry.

For example, a further operation may include a cyclic shifting operation, the latter performed thanks to the near-memory computation unit to obtain cyclically shift data.

Preferably, the further operations are performed as part of a cryptographic procedure such as an advanced encryption standard procedure, which involve multiple iterations between the readout circuitry and the near-memory computation unit. In particular, each of the multiple iterations may involve an XOR operation performed thanks to the readout circuitry, followed by a cyclic shifting operation performed thanks to the near-memory computation unit.

In embodiments, the method further comprises receiving, prior to applying said electrical signals, a request from an external computer system, whereby said electrical signals are applied in response to and in accordance with the request received. In turn, response data are produced based on the transformed data accordingly obtained and then forwarded to an external computer system.

The method typically includes preliminary steps. In particular, the method may further comprise applying electrical writing signals to at least one of the input lines corresponding to the L rows to write the operand data across the corresponding memory elements, prior to applying said electrical signals to the at least two input lines to read out and concurrently transform data.

As, such operand data may notably be cryptographic data encoding a cryptographic key. In this case, one or more electrical properties of the initial electrical signals applied may be adjusted so as to achieve a stochastic switching of memristors of the corresponding memory elements. As a result, only a fraction of the memristors switches to a given resistive state, whereas a complementary fraction of the memristors remain in an unchanged resistive state. This makes it possible to securely generate the keys stored in the memory device.

According to another aspect, the invention is embodied as a memory apparatus for processing data in-memory. The apparatus comprises a crossbar array structure including N input lines and M output lines, arranged in N rows and M columns, which are interconnected at cross-points defining N× M cells. The cells include respective memory elements, such as resistive memory elements. Overall, the crossbar array structure includes a set of N×M memory elements, which decompose into a first subset of K×M memory elements (for storing target data) and a second subset of L×M memory elements (for storing operand data), in accordance with a first subset of K rows and a second subset of L rows of the N rows, respectively. Again, the numbers M, N, K, and L are subject to the constraints N≥2, M≥2, 1≤L<M, and K+L=N. The apparatus further includes a selection circuit, which is configured to select at least two rows including at least one of the K rows and at least one of the L rows. The apparatus is further equipped with an electrical input unit, which is configured to apply electrical signals to at least two input lines corresponding to at least two rows, as selected by the selection circuit to obtain output signals in output of the M output lines. In operation, the obtained output signals depend on target values and operand values, in accordance with data stored across said at least two rows. Finally, the apparatus has a readout circuitry, which is connected to the output lines. Consistently with the present methods, the readout circuitry is configured to read out the obtained output signals and concurrently perform a transformation operation, in-memory, on the target values based on the operand values, to obtain transformed data.

The memory apparatus preferably comprise a near-memory computation unit connected to the readout circuitry. The latter preferably includes an array of sense amplifiers with adjustable threshold levels, wherein each sense amplifier of the array is connected in output of a respective output line. In addition, the memory apparatus may advantageously include a control unit connected to each of the sense amplifiers and configured to adjust the threshold levels of the sense amplifiers, so as for the readout circuitry to be able to implement logical operations involved in the transformation operation.

In embodiments directed to cryptographic applications, the operand data encode cryptographic keys. In this case, the electrical input unit and the readout circuitry may advantageously be jointly configured to prevent reading out any of the cryptographic keys in plain (i.e., in the clear).

According to a final aspect, the invention is embodied as a computerized system including one or more apparatuses as described above. Thus, each apparatus is adapted to perform a transformation operation. In addition, the system includes a service unit, which is connected to each apparatus and is configured to offload transformation operations to each of the apparatuses.

In embodiments, at least one of the one or more memory apparatuses further comprises a near-memory computation unit connected to the readout circuitry of the corresponding apparatus.

In preferred embodiments, the readout circuitry of each apparatus comprises an array of sense amplifiers with adjustable threshold levels, wherein each sense amplifier of the array is connected in output of a respective output line. In addition, each apparatus further comprises a control unit connected to each of its sense amplifiers and configured to adjust the threshold levels of its sense amplifiers, so as for its readout circuitry to be able to implement logical operations involved in the transformation operation.

In embodiments, the computerized system is a cryptographic service system, e.g., a key management system. The operand data stored in each of the apparatuses encode cryptographic keys and each apparatus is adapted to perform the transformation operation as a cryptographic operation. The service unit is connected to each apparatus and configured to offload cryptographic operations to any of the apparatuses. Preferably, the electrical input unit and the readout circuitry of each apparatus are jointly configured to prevent reading out any of the cryptographic keys stored therein in plain.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIGS. 3A and 3B illustrate encryption and decryption operations performed in output of the output lines, according to bitwise XOR operation performed at the readout circuitry of the memory device, as in embodiments;

The accompanying drawings show simplified representations of devices or parts thereof, as involved in embodiments. Similar or functionally similar elements in the figures have been allocated the same numeral references, unless otherwise indicated.

Apparatuses, systems, and methods for processing data in-memory, embodying the present invention will now be described, by way of non-limiting examples.

DETAILED DESCRIPTION

Embodiments of the present invention recognize that conventional solutions require massive data movement and typical suffer from von Neumann bottleneck. Certain other solutions typically rely on potentially insecure data channels (e.g., memory-to-processor) which are prone to malicious attacks. Embodiments of the present invention provide certain improvements over stateful logic. Specifically, certain embodiments provide up to four times fewer (e.g., between two and four times fewer) operations for the same task, function in low power (e.g., read-only), and do not require internal data-transfer. Specifically, embodiments of the present invention can store cryptographic key in a computational memory array along with data and perform the encryption and decryption of data via in-memory logical operations. In this embodiment, the computational memory array comprises memory devices organized in a crossbar configuration. The memory devices can be either resistance-based memory (e.g., PCM, ReRAM, MRAM, FeFET etc.) or charge-based devices such as DRAM and SRAM. In this embodiment, in-memory logic refers to bulk-bitwise operations performed without having to move the data into a processing unit. The in-memory logical operations are performed in such a way that neither the key nor the data are modified.

Specifically, in-memory XOR logic is executed between each plaintextbit and its corresponding key bit. Embodiments of the present invention can provide real-time encryption, in place, during readout. Encrypted data (e.g., ciphertext) may be used. In this embodiment, decryption occurs similarly with the same key and SA is configured as in figure "XOR logic".

The following description is structured as follows. General embodiments and high-level variants are described in Section 1, while Section 2 addresses specific embodiments. As used herein, the present method and its variants are collectively referred to as the "present methods". All references Sn refer to methods steps of the flowcharts of FIG. 6, while numeral references pertain to systems, apparatus, devices, components, and concepts involved in embodiments of the present invention.

1. General Embodiments and High-Level Variants

Figure 1A:
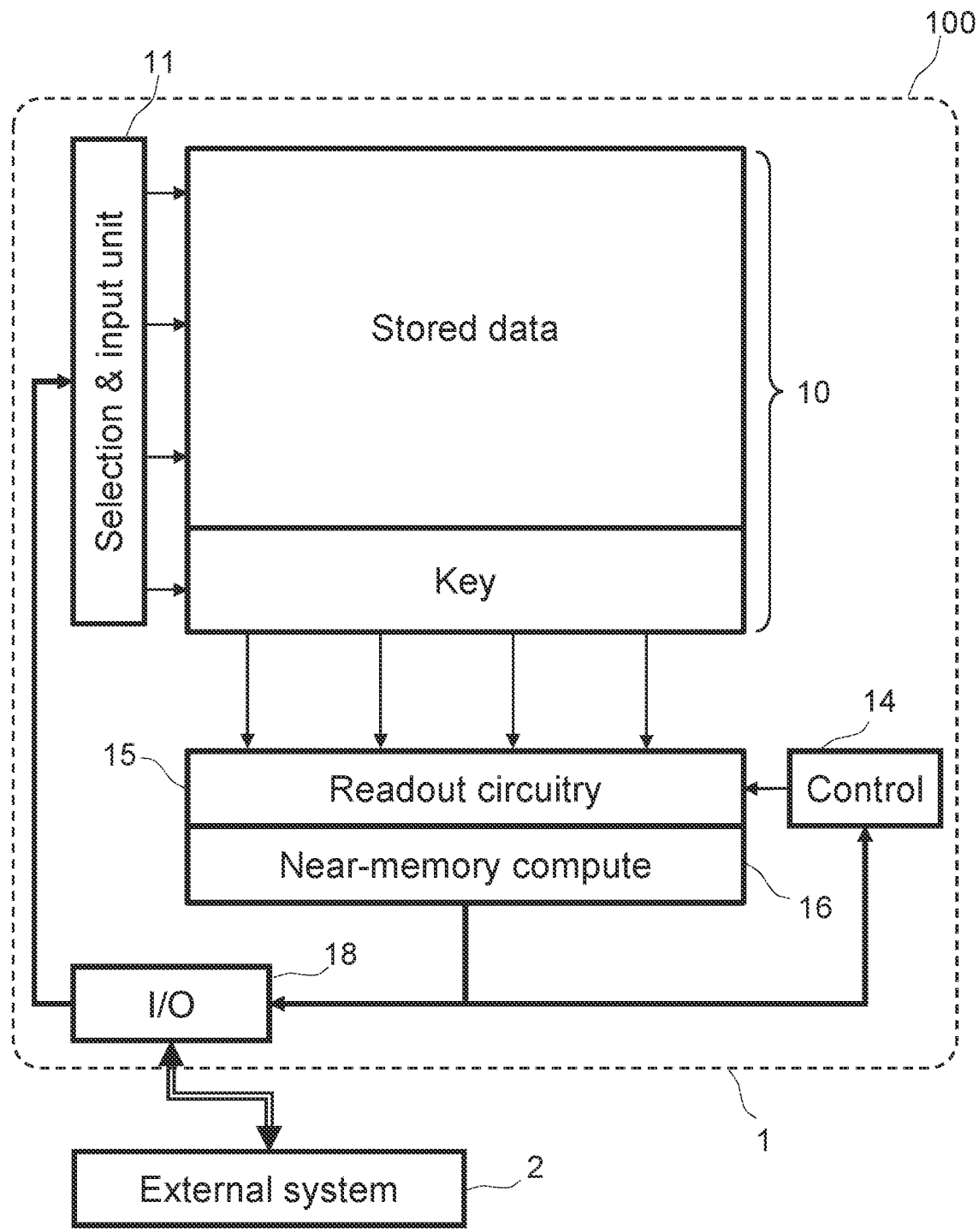
FIG. 1A is a diagram depicting the architecture of a computerized system according to embodiments, where the system includes a memory device having a crossbar array structure, a readout circuitry and a near-memory computation unit. In this example, the system is further configured to interact with external computers.
Figure 1B:
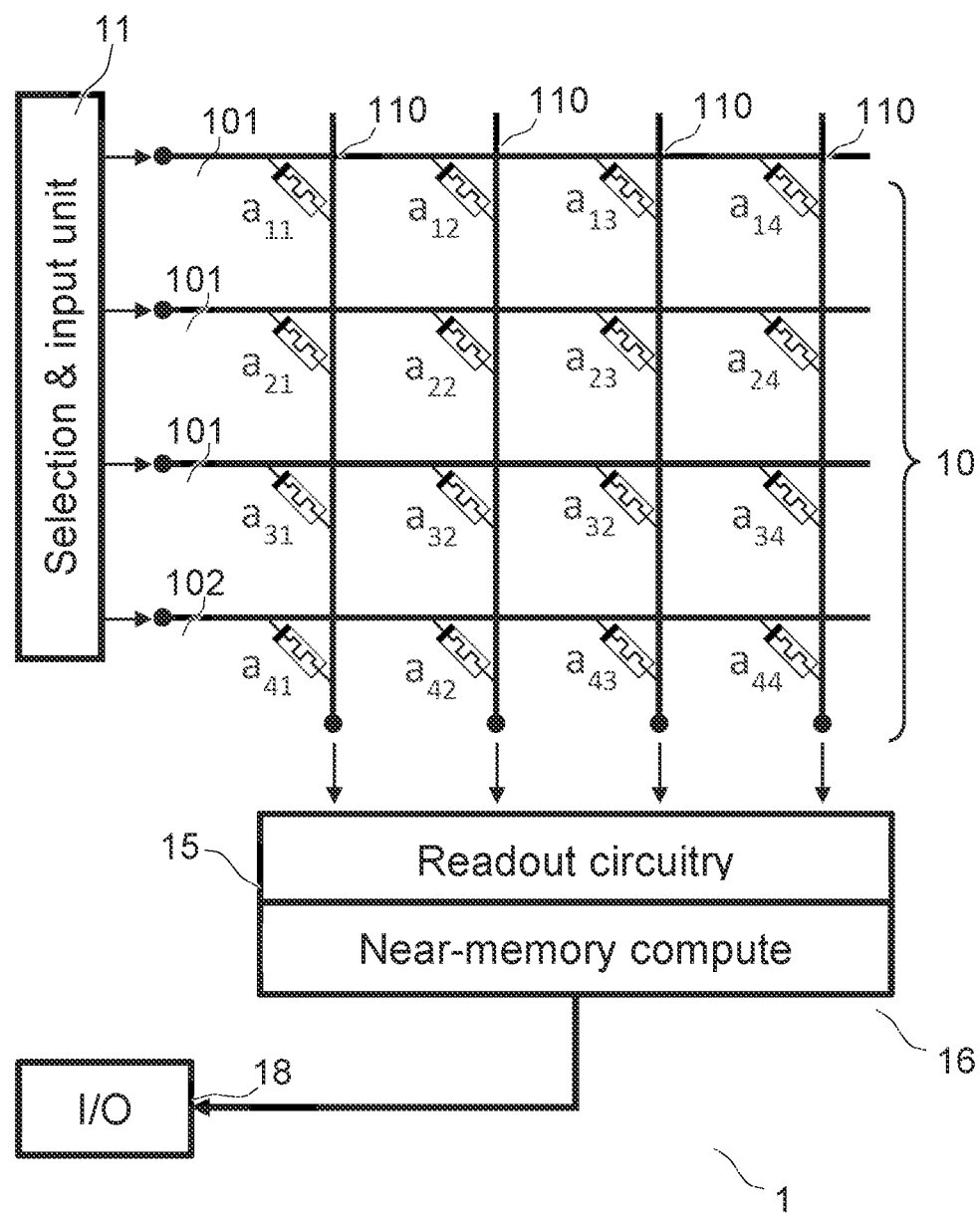
FIG. 1B focuses on the memory device shown in FIG. 1 and schematically depicts the crossbar array structure of the device, as involved in embodiments. The number of input and output lines is purposely small, for the sake of depiction.
Figure 6:
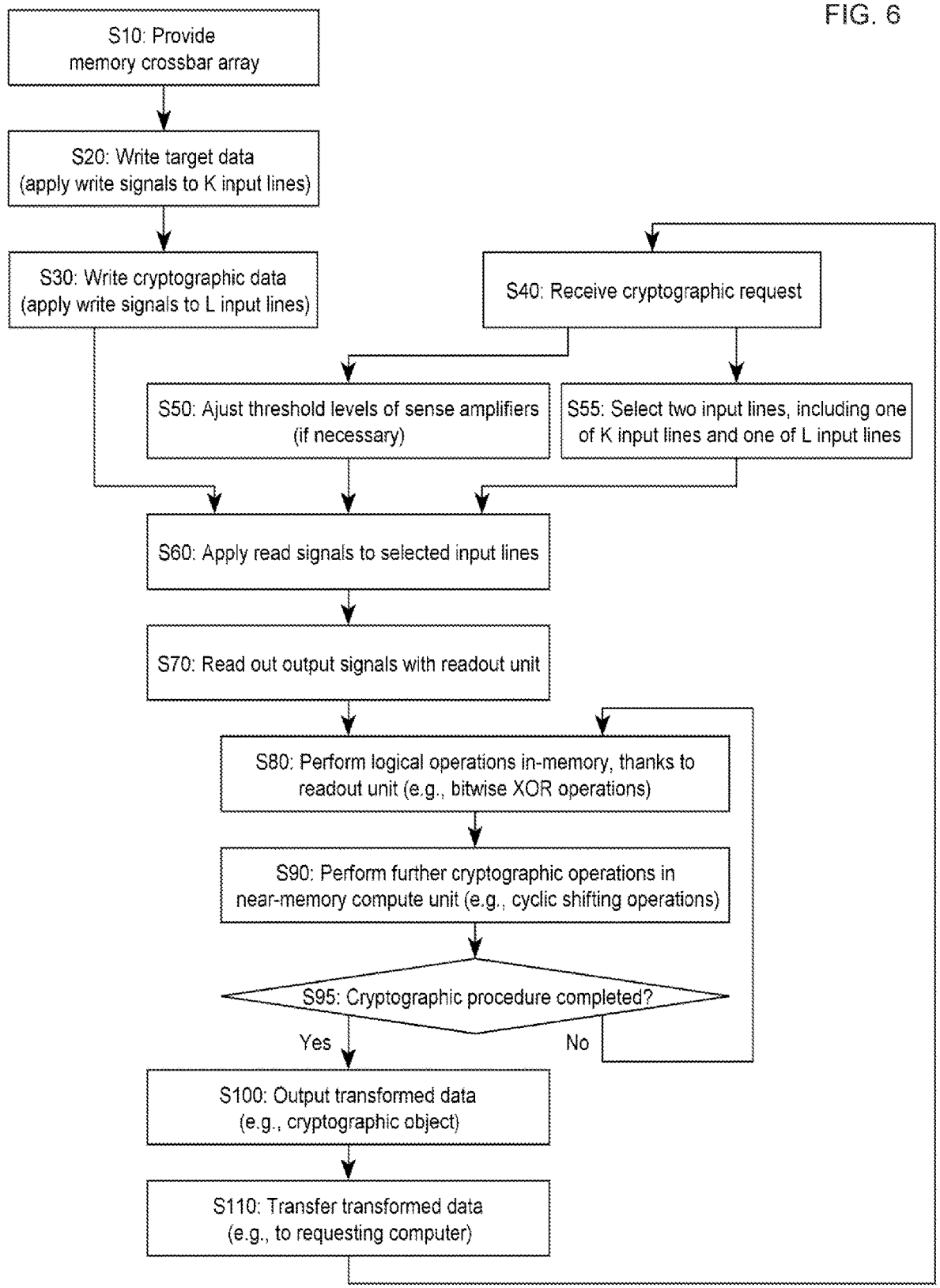
FIG. 6 is a flowchart illustrating high-level steps of a method of processing data in-memory with a view to performing cryptographic operations, according to embodiments.

A first aspect of the invention is now described in reference to FIGS. 1A, 1B, and 6. This aspect concerns methods of processing data in-memory. The present methods rely on a memory device 1 such as shown in FIGS. 1A and 1A. So do other aspects of the present invention (i.e., directed to memory apparatuses and computerized systems), which are described later in detail.

The device 1 has a crossbar array structure 10. As illustrated in FIG. 1B, the structure 10 includes N input lines 101, 102, as well as M output lines 110. The input lines and output lines are arranged in N rows and M columns, which are interconnected at cross-points. There are N×M crosspoints in total, which define N×M cells. That is, each cross-point is associated with a cell. The cells include respective memory elements di, which can for instance be resistive memory elements Overall, the crossbar array structure 10 includes a set of N×M memory elements $a_{ij}$.

As per the present approach, the set of memory elements $a_{ij}$ decomposes into two subsets, i.e., a first subset of K×M memory elements and a second subset of L×M memory elements. The two subsets are defined in accordance with a first subset of K rows and a second subset of/rows of the N rows of the device 10. In the simple example of FIG. 1B, the first subset of K rows corresponds to the three input lines 101, while the second subset of L rows consists of a single row corresponding to the single input line 102. In practice, however, each row subset of the memory device will typically include hundreds to thousands of rows, e.g., between 300 and 1500 rows each, or more.

According to the present methods, target data are stored across the first subset of K×M memory elements, whereas operand data are stored across the second subset of L & M memory elements. The target data refers to informative (e.g., plain) data. The operand data are exploited to transform the target data; the operand data may for example encode cryptographic data (e.g., cryptographic keys) that are used to encrypt or decrypt the target data, as discussed later in detail. The target data and operand data are stored in cells of distinct rows, that is, the operand data are stored in memory elements of the first subset of rows, while informative data are stored in the remaining rows, that is, the second subset of rows. The two subsets of row may possibly correspond to distinct (i.e., non-overlapping) areas of the arrangement of rows and columns of the device 1, but this is not necessary.

The above numbers N, M, K, and L are subject to the following minimal constraints:

N≥2. That is, there are at least two input lines;
M≥2. I.e., there are at least two output lines; and
1≤L<M, while K+L. N. At least one row (1≤L) of the N rows is meant to store operand data, but the sum K+L amounts to the total number of N rows. Thus, the N≥2 rows include at least one row in each of the two subsets mentioned above.

To summarize, K×M memory elements are used to store the target data. The K×M memory elements belong to cells defined by the K corresponding rows of the N total rows. The operand data are stored in a complementary subset of L×M memory elements, corresponding to cells of the remaining/rows (K+L=N). Note, additional rows and columns may possibly be involved in the array 10, e.g., for control purposes, such that the overall array may possibly be larger than N×M.

As per the present methods, electrical signals are concurrently applied to input lines leading to each of the two subsets of rows, with a view to producing a transformation of the data stored in the first subset of rows upon reading out the data, thanks to operands stored in the second subset. In detail, electrical signals are applied (see step S60 in the flow of FIG. 6) to at least two input lines 101, 102, which correspond to at least two rows, the latter including at least one of the K rows and at least one of the L rows. This way, the output signals obtained in output of the M output lines 110 depend on target values and operand values, in accordance with data stored across the (at least two) rows to which the electrical signals are applied at step S60. By construction, the output signals are obtained as multiply-accumulate signals.

The output signals are read out at step S70. A unique feature of the proposed approach is that a transformation operation is concurrently performed S80 (i.e., upon readout out output values). This transformation is performed in-memory, i.e., in the memory device 1. By construction, the transformation is applied to the target values corresponding to data stored in at least one of the K rows, based on the operand values corresponding to data stored in at least one of the L rows. Thus, the data eventually obtained differ from the data that would be obtained by merely reading out the target data, as done with usual crossbar array structures. Yet, neither the stored operand data nor the stored target data are modified upon reading them out as the data stored across the N rows remain unchanged.

Importantly, the transformation here is performed as part of the readout operation (i.e., while reading out the output signals), without incurring additional time and computational costs. This means that the time and power required to read out and transform the target data are substantially the same as the time and power that would be required to read out the sole target data, without transforming them. Thus, the target data can be read out and concurrently transformed, essentially "for free", thanks to the present approach. For the rest, operating a crossbar array structure 10 as described above requires very low power, compared with conventional memory devices.

Embodiments of the present invention can be used for any type of transformations. For example, it can be used to scale the data stored or somehow change their output representations. Embodiments of the present invention provide certain advantages. Specifically, embodiments of the present invention can exploit the proposed approach for cryptographic applications, as mostly assumed in the preferred embodiments described below.

To start with, the memory device 1 preferably comprises a readout circuitry 15, arranged in output of the output lines 110, as illustrated in FIGS. 1A and 1B. The output signals are read out S70 by the readout circuitry 15 and the transformation operation is concurrently performed S80 at the readout circuitry 15, while reading out S70 the output signals. The signals eventually obtained are impacted by both the target data and the operand data. In practice, the readout circuitry 15 can be complemented by a control unit 14, as shown in FIG. 1, for reasons that will become apparent later. Still, the control unit 14 can be regarded as forming part of the readout circuitry, as assumed in FIG. 1B.

In addition, the device 1 may further include a selection circuit and an electrical input unit 11, as assumed in FIGS. 1A and 1B. In addition, the units 10, 11, 14, 15 may advantageously be complemented by a near-memory computation (NMC) unit 16, for reasons discussed later. Note, the crossbar array 10, the selection and input unit 11, the control unit 14, the readout circuitry 15, and the NMC unit 16, may possibly be co-integrated in the memory device 1. In variants, only a subset of these components are co-integrated. So, in general, the units 10, 11, 14-16 can be considered to form part of an apparatus 1, which is later described in detail, in reference to another aspect of the invention. Furthermore, the apparatus 1 may notably be used in a computerized system 100, e.g., designed to provide cryptographic encryption, decryption, and/or key generation, as a service, as discussed later in reference to a further aspect of the invention.

In certain embodiments of the present invention, the readout circuitry 15 comprises an array of sense amplifiers 153, where the sense amplifiers 153 have adjustable input threshold levels. "Adjustable" means variable. The transistors are externally adjusted, e.g., via the control unit 14. In practice, the input threshold levels can be set as voltages or currents as part of an analog circuitry, as known per se. Each sense amplifier (denoted by "SA" in FIGS. 2 and 4) of the array is connected in output of a respective one of the output lines 110. One such sense amplifier 153 can be seen in FIGS. 2 and 4, which depict, each, a circuit portion corresponding to a single output line 110. As noted earlier, the transformation operation applied at step S80 preferably involves logical operations. Now, the threshold levels of the sense amplifiers 153 can be adjusted S50 to allow the amplifiers to implement S80 such logical operations. This, in the present context, allows a variety of logical operations to be performed upon reading out the data, as part of said transformation.

In particular, an important class of applications involves cryptographic transformations. In this case, the operand data typically encode a cryptographic key. This means that the operand values stored across the second subset of rows are cryptographic values, i.e., vector components that together form a key. That is, the transformation operation is a cryptographic operation, which is based on the cryptographic key.

The cryptographic operation performed may notably be a decryption operation or an encryption operation (based on the above cryptographic key), such that the transformed data obtained are decrypted data or encrypted data. The target data are encoded as K×M values stored across the K×M memory elements, whereas cryptographic keys can be encoded as L×M values stored across the second subset of L×M memory elements. The target data and the keys do not necessarily have the same dimensions. I.e., various mappings can be contemplated. For example, the target data can be stored as K distinct vectors of size M, while L distinct keys can be stored in the second subset (again of size M). In variants, the second subset can be used to store a single key of size L×M. Many other variants can be devised.

Importantly, the present scheme is compatible with both symmetric and asymmetric encryption. In symmetric encryption applications, the same cryptographic keys are stored across the crossbar array 10. In asymmetric encryption applications, the crossbar array 10 can be used to store private keys only, while the corresponding public keys may be stored elsewhere. So, both asymmetric and symmetric cryptographic applications can be contemplated.

Such cryptographic applications rely on cryptographic processes that typically involve an exclusive OR (XOR) operation, a logical AND (LAND) operation, and/or a logical OR (LOR) operation. In the present context, such operations can be performed upon reading out the target data. That is, the target data can be stored together with cryptographic keys, in the crossbar array 10, and in-memory logic operations (such as XOR, LAND, and/or LOR operations) may be performed upon reading out S80 the target data. Again, neither the key nor the target data are modified in the memory array 10; the transformation is operated upon readout out the data.

Such elementary operations may possibly form part of a sophisticated cryptographic procedure. In particular, a cryptographic procedure can be implemented by complementing elementary operations as evoked above by further operations (as involved in, e.g., an advanced encryption standard procedure), executed by the NMC unit 16 connected in output of the readout circuitry 15.

Beyond encryption and decryption, however, the present methods may also be used for hashing, hash-based message authentication codes (HMACs), and key generation applications. For example, cryptographic keys or nonces can be generated using stochastic generation processes, which are described later in detail.

Figure 2:
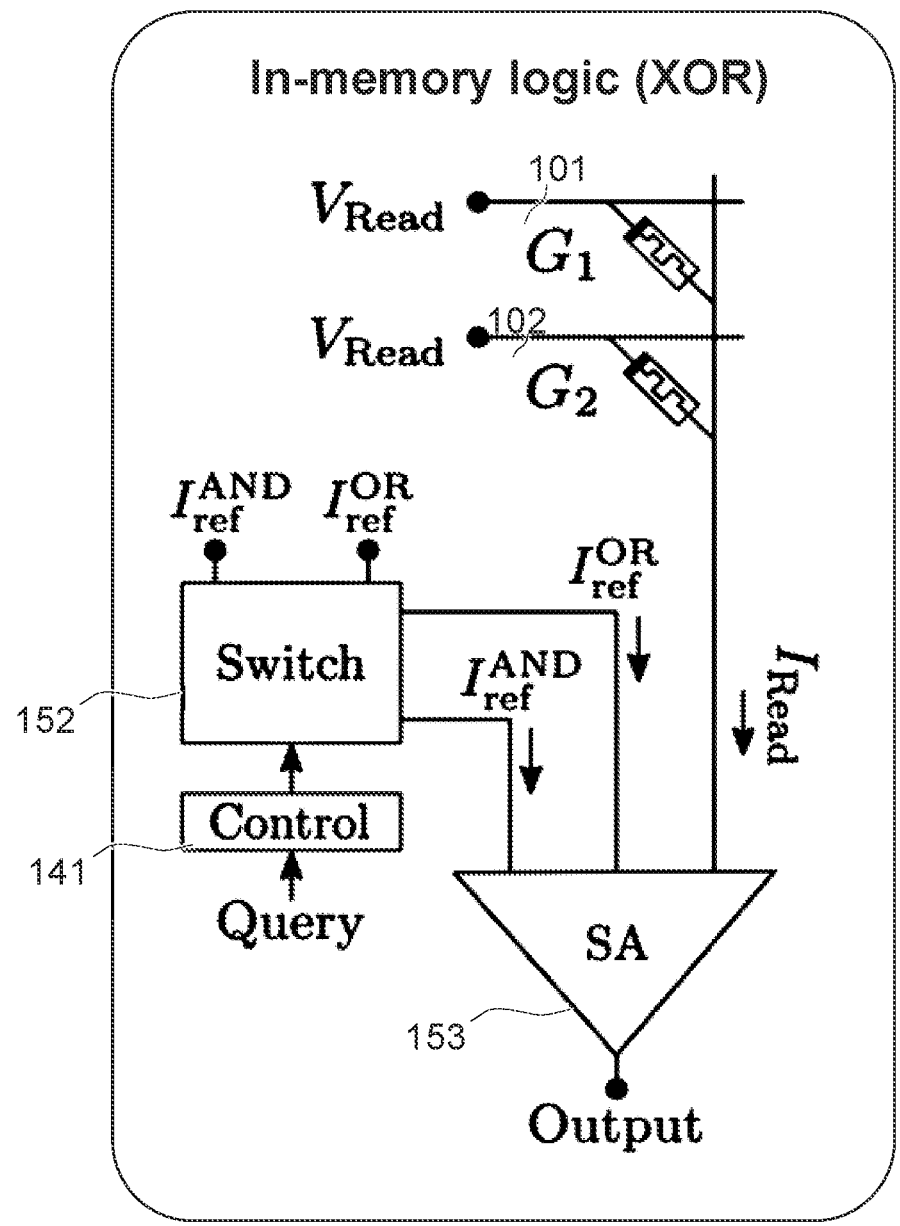
FIG. 2 is a circuit diagram of a portion of an electrical circuit used to perform an exclusive OR (i.e., XOR, or exclusive disjunction) operation on data read out from a single output line of a crossbar array structure such as shown in FIG. 1B, by applying electrical signals to two input lines of the crossbar array structure, as involved in embodiments. In practice, several such circuit portions connect to respective output lines of the memory device.
Figure 4:
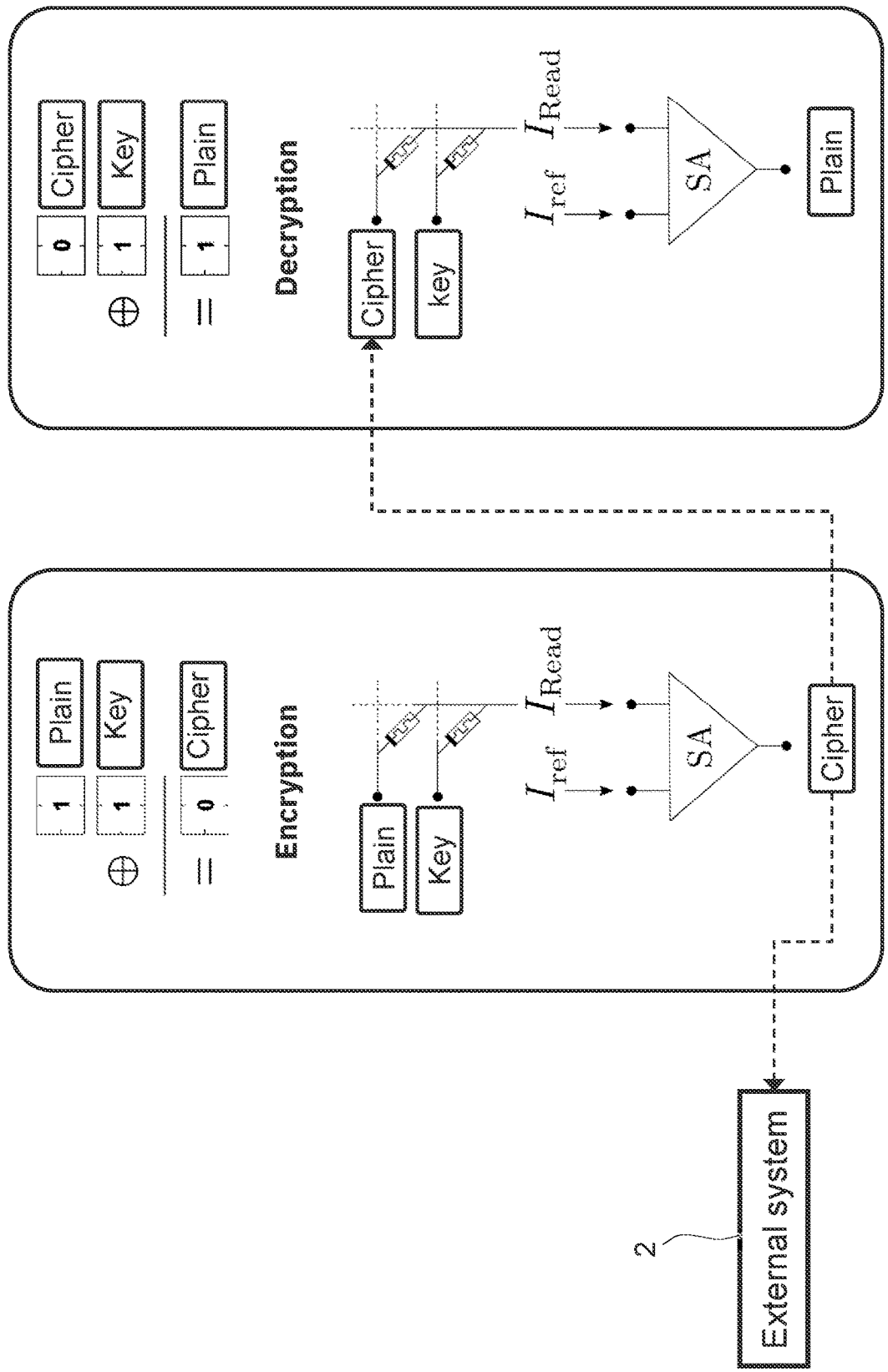
FIG. 4 is a diagram schematically illustrating how encryption and decryption operations can be performed upon request of an external computer, using one or more memory apparatuses such as shown in FIGS. 1A and 1B, as in embodiments.

Each of the examples shown in FIGS. 2 and 4 assumes that the logical operations consists of a bitwise XOR operation. This operation involves a target value and a cryptographic value, which are selected by virtue of the electrical signals applied at step S60. Such values are read out S70, S80 as part of the signal obtained in output of the corresponding output line 110. A single output line is shown in each of FIGS. 2 and 4, for simplicity. However, the XOR operation operates on two bit patterns formed by a set of target values and a simultaneously selected set of cryptographic values. In this example, the two bit patterns have a same length M, by construction. The logical exclusive OR operation is performed on each pair of corresponding bits, as illustrated in FIGS. 3A and 3B, for both an encryption (FIG. 3A) and a decryption (FIG. 3B) operation. Each bit corresponds to one of the M columns. The encryption operation is performed according to A⊕B=C, where A, B, and C, respectively corresponds to the plain data (i.e., the target data), the key, and the cipher. Conversely, the decryption operation is performed according to C⊕B=A, as illustrated in FIGS. 3A and 3B. More generally, the cryptographic operations may be based on XOR, LAND, and/or LOR operations. Such elementary operations can be achieved by simultaneous activation of the relevant rows and sensing with suitably adjusted thresholds.

As noted earlier, elementary logic operations (XOR, LAND, and/or LOR operations) can be complemented by additional operations, notably in advanced cryptographic applications. That is, one or more additional operations may be performed (see step S90 in FIG. 6) based on the transformed data obtained at step S80, thanks to the NMC unit 16 connected in output of the readout circuitry 15. These additional operations may notably include one or more cyclic shifting operations, performed S90 by the NMC unit 16. This makes it possible to obtain cyclically shifted data, which can advantageously be used in advanced cryptographic procedures.

More generally, various types of operations may potentially be performed at step S90, thanks to the NMC unit 16. Such operations may notably be performed S90 as part of a cryptographic procedure S80, S90, S95, which is now described in detail. Typically, the cryptographic procedure will require multiple iterations between the readout circuitry 15 and the near-memory computation unit 16. For example, such iterations may involve, each, an XOR operation performed S80 thanks to the readout circuitry 15, followed by a cyclic shifting operation performed S90 thanks to the NMC unit 16. More generally, though, such iterations may involve various types of logic operations (performed by the readout circuitry 15 of the memory device 1), such as LOR and/or LAND operations, followed by a further operation performed at the NMC unit 16, before looping back to the readout circuitry 15 for it to perform another logical operation, and so on.

For example, the cryptographic procedure may be an advanced encryption standard (AES) procedure. In the present context, such a procedure can be implemented using a mix of in-memory and near-memory compute operations. Thus, the NMC unit 16 can loop with the readout circuitry 15 to perform an AES encryption or an AES decryption operation.

Assume, for example, that an AES encryption is to be performed. This AES procedure can be broken down into several computational steps, as described below.

To start with, a key expansion ("KeyExpansion") is required, whereby round keys are derived from a cipher key using the AES key schedule. The key schedule involves majority XOR operations, where the XOR operations can be performed by the readout circuitry 15 in combination with the NMC unit 16 taking care of the additional operations. The AES requires a separate 128-bit round key block for each round plus one additional key block. During the initial round key addition ("AddRoundKey"), each byte of the state is combined with a byte of the round key using a bitwise XOR operation performed thanks to the readout circuitry 15. Then, several (typically 9, 11 or 13) rounds of operations are performed. These involve the so-called "SubBytes", "ShiftRows", "MixColumns" operations, followed by another AddRoundKey step. The SubBytes, ShiftRows, and MixColumns operations are performed by the NMC unit 16, while the subsequent AddRoundKey step is performed at the readout circuitry 15. The SubBytes operation is a non-linear substitution step, where each byte is replaced with another. The ShiftRows operation is a transposition step, where the last three rows of the state are shifted cyclically a certain number of steps. The MixColumns operation is a linear mixing operation operating on columns of the state, combining the four bytes in each column.

More generally, the NMC unit 16 may interact with the readout circuitry 15 to implement other cipher and/or hash procedures, using principles similar to those described above. For example, the present approach can be used to implement different cipher modes such as the so-called AES-CBC, AES-CFB, AES-OFB, and AES-CTR modes. It is also compatible with stream ciphers, such as the so-called SALSA20 and CHACHA ciphers, which involve modular addition, rotation, and XOR operations. Similarly, the present approach may be used to hash data according to, e.g., the so-called SHA2 or SHA3 algorithm, which involves XOR, LAND, rotation, and modular addition operations. It can further be used in procedures involving hash-based message authentication codes (HMACs), as used in signatures in symmetric cryptography, which involve hashing, XOR, and concatenation.

A further advantage of the present approach is that the security class of in-/near-memory cryptography is intermediate between hardware security modules (HSMs) and traditional computing. Crossbar structures as proposed herein potentially have a lower power consumption and can be dimensioned to have a higher storage capacity than HSMs. While the underlying crossbar array structures 10 will not necessarily impose the same hardware sophistication as HSMs, the keys can nevertheless remain hidden in the crossbar array 10 and do not need to be exposed in plain outside the memory device 1. In that respect, it is worth noting that the input unit 11 and the readout unit 15 can be jointly configured to prevent reading out the sole keys. For example, the input unit 11 may prevent applying input signals to the sole rows storing the keys. That is, the input unit may be set to systematically apply input signals to at least one of the K rows, in addition to at least one of the L rows. In addition, the readout unit 15 can be configured to systematically perform the transformation, so that it is impossible to obtain a key in plain.

Thus, the present methods can notably be used for encryption, decryption, and/or key generation operations as a service, where the underlying arrays 10 ensure a secure key storage. Plus, a secure key generation process can be achieved thanks to the stochastic writing procedure discussed below. And, given that public keys corresponding to private keys as stored in the memory devices 1 can be stored externally, the present methods may notably be used to implement public-key cryptography standards such as the so-called PKCS #11 standard, and accordingly provide HSM-like functionality, albeit with easier interaction. Incidentally, the present techniques may also be used to implement a traditional key management system (KMS) with support for symmetric cryptography.

In such applications, a system 100 equipped with one or more in-memory computing memory devices 1 may routinely address external requests from external systems, as illustrated in FIG. 4. That is, upon receiving S40 a request from an external computer 2, the system 100 may instruct to apply S55 electrical signals to selected rows of a memory device 1, where such rows and selected in accordance with the request received at step S40. If necessary, the levels of the corresponding sense amplifiers are adjusted (in accordance with the logical operation to be performed), prior to applying S55 the input signals, to enable the required logical operations. This, in turn, causes to read out S70 output data and concurrently perform S80 a transformation (possibly as part of an advanced cryptographic procedure, requiring several iterations S80-S95), to eventually produce S100 response data, which are obtained based on the transformed data. The response data are then forwarded S110 to an external computer. Note, the response data produced by the memory device 1 may be returned directly to the requesting entity 2 or to another entity, this depending on the intended application and the configuration of the system 100 and its environment. I.e., the external computer to which the response data is forwarded need not necessarily be the same as the requesting computer 2.

In preferred embodiments, the memory elements aij of the cells of the device 1 are resistive memory elements. Preferably, such resistive memory elements are selected among phase-change memory (PCM), resistive random access memory (RRAM or ReRAM), and magnetoresistive random access memory (MRAM) elements. Beside their low-power consumption, such elements may advantageously be leveraged to implement a stochastic process, to securely generate S30 cryptographic keys.

Target data are initially written by applying S20 corresponding electrical signals to the input lines 101 corresponding to the K rows, which effectively writes the target data in the corresponding row subset of the crossbar array 10. Cryptographic values can be similarly written by applying S30 electrical signals to input lines 102 corresponding to the L rows, so as to write cryptographic data across the corresponding memory elements. Remarkably, electrical properties of the electrical signals applied at step S30 can be adjusted so as to achieve a stochastic switching of the memristors of the resistive memory elements of the second subset. As a result, only a fraction of the memristors switches to a given resistive state, whereas a complementary fraction of the memristors remain in in the same (unchanged) resistive state. Resistive memory elements such as listed above (i.e., PCM, RRAM, and MRAM elements) can suitably be used to that aim.

Figure 5:
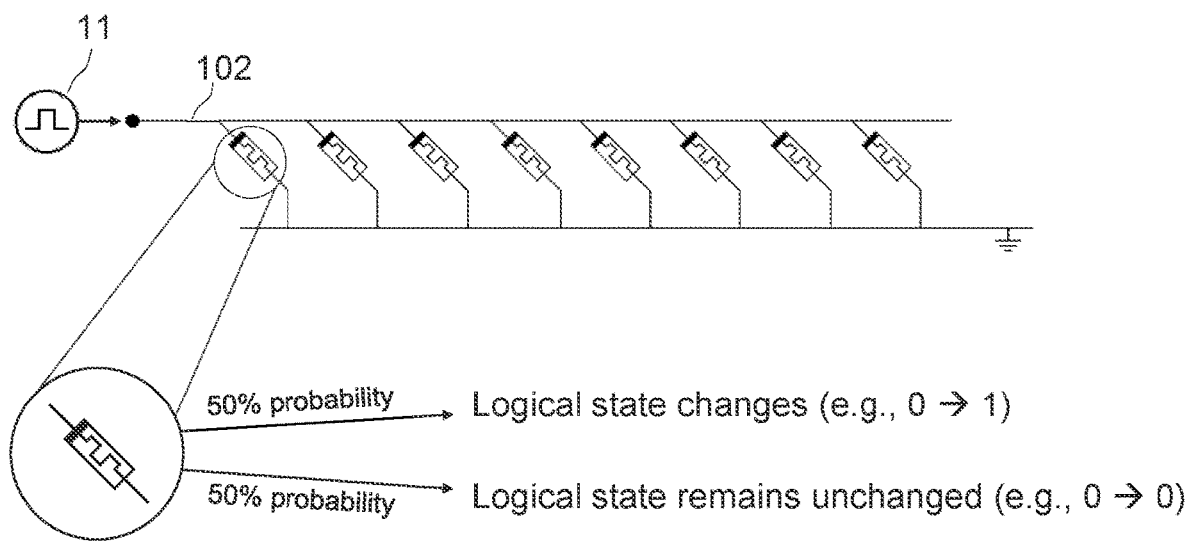
FIG. 5 is a diagram illustrating how a cryptographic key can be securely generated, using a stochastic process, and then stored in a row of a memory apparatus such as shown in FIGS. 1A and 1B, as in embodiments.

This phenomenon is illustrated in FIG. 5. Although deterministic input signals are used to write the cryptographic data, non-deterministic value are obtained in the memory elements of the cells. Thus, the resulting key is securely generated, since it is not possible to predict the key accordingly obtained, despite the deterministic input signals used to obtain it. This can be achieved by adjusting the intensity of the electric field (or current) used to switch the memory elements at step S30. Such properties are typically device-specific. For example, device-specific pulses can be adjusted and applied so that there is ca. 50% chance of phase-switching for given PCM memory elements. This type of stochastic switching can also be achieved with other resistive memory elements as listed above (RRAM and MRAM elements).

For completeness, the crossbar memory device 1 may possibly be configured to prevent reading the keys stored therein, as noted earlier. Thus, not only a secure key generation process can be achieved, thanks to a stochastic process described above, but, in addition, a secure key storage can be obtained by suitably configuring the memory device 1, whereby the stored keys can never leave the device 1 in plain.

Note, the memory elements of the second subset (i.e., used to store the keys) may possibly differ from the memory elements used to store the target data. For example, PCM, RRAM, or MRAM elements may compose the second set, while memory elements of the first set may consist of other types of devices, possibly memristive devices such as static random-access memory (SRAM). In embodiments where no stochastic key generation is required, further types of memory elements can be contemplated, such as flash memory elements. Preferably, the memory elements are non-volatile memory elements, which are modulated electrically to store binary or multi-bit data, as known per se.

Another aspect of the invention is now described in reference to FIGS. 1A and 1B, which concerns a memory apparatus 1 for processing data in-memory. This apparatus 1 basically includes a crossbar array structure 10, a selection circuit 11, an electrical input unit 11, and a readout circuitry 15. The latter may include or be complemented by a control unit 14.

The crossbar array structure 10 has been described earlier. It involves N input lines 101, 102 and M output lines 110, arranged in N rows and M columns, which are interconnected at cross-points defining N×M cells, where the cells include respective memory elements $a_{ij}$, which preferably are resistive memory elements, for the reasons explained earlier. As per the present approach, the N×M memory elements $a_{ij}$ decompose into two subsets, i.e., in accordance with the first subset of K rows and the second subset of L rows. This results in a first subset of K×M memory elements, intended for storing target data, and a second subset of L×M memory elements, meant for storing operand data.

The selection circuit 11 is generally configured to select at least two rows, these including at least one of the K rows and at least one of the/rows, with a view to applying electrical signals to the selected rows. The electrical input unit 11 is configured to apply such electrical signals to at least two input lines 101, 102, i.e., corresponding to at least two rows, as selected by the selection circuit 11, in operation. This, in turn, makes it possible to obtain output signals in output of the M output lines 110. By construction of the crossbar, the signals are obtained as multiply-accumulate signals. I.e., these output signals depend on target values and operand values, in accordance with data stored across the selected rows. The selection circuit and the electrical input unit may form part of a same unit 11, as assumed in FIGS. 1A and 1B.

The readout circuitry 15 is connected to the output lines 110. It is generally configured to read out the obtained output signals and concurrently perform a transformation operation, in-memory, on the target values based on the operand values, to obtain transformed data, as described earlier in reference to the present methods. In particular, the readout circuitry 15 may include an array of sense amplifiers 153, having adjustable threshold levels. Each sense amplifier is connected in output of a respective output line 110, as illustrated in FIG. 2. In that case, the memory apparatus 1 will further include comprises a control unit 14 connected to each of the sense amplifiers 153 and configured to adjust the threshold levels of the sense amplifiers 153. This makes it possible for the readout circuitry 15 to implement logical operations involved in the transformation operation, as described earlier.

The crossbar array structure 10, the selection circuit 11, the electrical input unit 11, the control unit 14, and the readout circuitry 15 are preferably co-integrated on a same chip, forming an in-memory computing memory device. In addition, the memory apparatus 1 may further include an NMC unit 16, connected in output of the readout circuitry 15. The NMC unit 16 may advantageously be co-integrated with the other components 10, 11, 14, 15, in a same device 1. For completeness, the apparatus 1 may additionally include an input/output unit 18, which interfaces the units 11-16 with external computer systems 2. For instance, an external computer may be used to operate the apparatus 1. In turn, this computer may be used to process requests from other computers, e.g., to perform cryptographic operations as discussed earlier.

Figure 7:
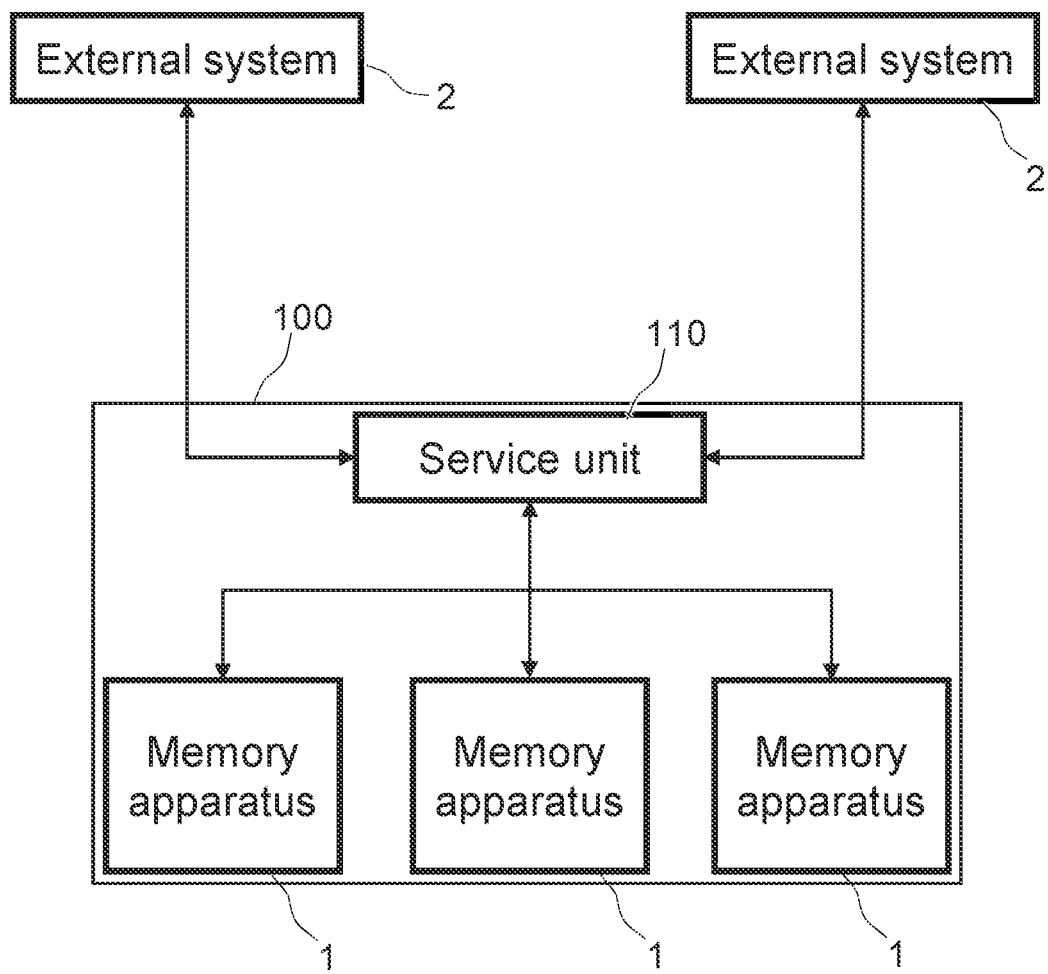
FIG. 7 is a high-level diagram of a cryptographic service system involving several memory apparatuses such as shown in FIGS. 1A and 1B, where the system is designed to offload cryptographic operations to such apparatuses to serve cryptographic requests of external computers, according to embodiments.

Referring to FIG. 7, a final aspect of the invention concerns a computerized system 100. The latter includes one or more apparatuses 1 such as described above. In the example of FIG. 7, the system 100 includes only three such apparatuses, for the sake of depiction. The system 100 further include a service unit 110, i.e., a computer, which is connected to each of the apparatuses 1 of the system 100. A main task of the service unit 110 is to offload operations to any or each of the apparatuses 1, e.g., upon requests of external computer systems 2.

The computerized system 100 is preferably configured as a cryptographic service system 1. In that case, the operand data stored on the apparatuses 1 encode cryptographic keys and the service unit 110 offloads cryptographic operations to the apparatuses 1. Any of the apparatuses 1 can be used to perform cryptographic operations as described earlier in reference to the present methods. Note, the system 100 may possibly include additional apparatuses, which are configured to perform other types of operations.

A particularly appealing feature of the above system 100 is that it enables low-power (symmetric) cryptography. Thus, cryptographic operations (such as the generations of keys required for TLS sessions) may be judiciously offloaded from a conventional computing system 2 to a memory apparatus 1 as described above, to free up CPU cycles and reduce computational power.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The above embodiments have been succinctly described in reference to the accompanying drawings and may accommodate a number of variants. Several combinations of the above features may be contemplated. Examples are given in the next section.

2. Specific Embodiments-Technical Implementation Details 2.1 Preferred Apparatus Architecture and Readout-Circuitry The apparatus 1 shown in FIGS. 1A and 1B includes a crossbar array 10, connected to a selection and input unit 11 for writing data thereto. The apparatus 1 further includes a readout circuitry 15 for reading out data produced by the array 10. The readout circuitry 15 may include an array of sense amplifiers, as assumed in FIGS. 2 and 4. In that case, a control unit 14 is used to adjust the levels of the sense amplifiers, as and if needed, so as to be able to perform the required logical operations. An NMC unit 16 is connected in output of the readout circuitry 15. An input/output unit 18 (I/O, possibly a computer) interfaces the components 11, 14, 16 of the apparatus 1, and may further interface the apparatus 1 with external computers 2. In response to external requests (queries), the I/O unit 18 instructs the control unit 14 to suitably adjust the threshold levels of the sense amplifiers, if necessary. In addition, the I/O unit 18 instructs the selection and input unit 11 to apply input signals to the array 10, while further instructing the control unit 14 to apply certain signals to the readout circuitry 14, to enable a transformation while reading out data, in accordance with principles described earlier.

In detail, and as seen in FIGS. 2 and 4, each portion of the readout circuitry, as connected in output of each output line 110, may include a switch 152 and a sense amplifier 153. The control element 141 actually forms part of the control unit 14. The control element 141 controls the switch 152 for it to couple two reference currents ($I_{ref}^{AND}$ and $I_{ref}^{OR}$) into the sense amplifier SA 153, which additionally takes a read input current $I_{read}$ in this example. The read input current is obtained in output of the corresponding output line 110. The output of the sense amplifier SA is raised at the logical level "1" when $I_{read}$ is between $I_{ref}^{AND}$ and $I_{ref}^{OR}$, else it outputs a voltage signal corresponding to logical level "0". This example assumes that a low value of the electrical conductance G is associated to a logical 0, while a high value of G is associated to a logical 1, both represented in terms of conductance logical state-variables. In this manner, a logical XOR operation is performed on the logical states corresponding to G1 and G2.

That is, the idea is to perform a logical XOR operation based on the logical states corresponding to G1 and G2. As opposed to conventional CMOS circuitry, the circuit schemes shown in FIGS. 2 and 4 rely on both conductance and voltage logical state-variables. In terms of voltage state-variables, if the sense amplifier SA outputs a high voltage, then this implies a logical 1, else a logical 0. Note, this corresponding to the only variant permitted with a conventional CMOS circuitry. In the present case, however, if both G1 and G2 values are low, then the current will be less than $I_{ref}^{OR}$. The sense amplifier SA will then output a low-voltage signal. Similarly, if both G1 and G2 values are high, then the current will be larger than $I_{ref}^{AND}$ and the sense amplifier will again output a low-voltage signal. However, if the G1 and G2 values combine a low-conductance value and a high-conductance value, the read current will be between the two reference values and the sense amplifier will output a high-voltage signal. In other words, this amounts to implementing the following truth table, which captures all possible outcomes of an XOR operation, i.e., (0, 0)→0,
(1, 0)→1,
(0, 1)→1, and
(1, 1)→0.

A similar circuit design can be used to achieve AND/OR gates, albeit relying on a single reference current. For NOT implementations, a controlled multiplexer (MUX) can be connected in output of the sense amplifier. When selected, the NOT gate inverts the result. Various logic operations can accordingly be achieved.

2.2 Preferred Flow of Operations in Cryptographic Applications

FIG. 6 shows a flow of operations that can advantageously be performed in cryptographic applications as described in section 1. A memory crossbar array 10 is provided at step S10, e.g., as part of an apparatus 1 or a system 100. Initially, target data are written S20 by applying write signals to one or more of the K input lines 101 (first row subset). Similarly, cryptographic data may be written S30 by applying write signals to one or more of the L input lines (second subset), though, in this case, the write signals may be adjusted to ensure a stochastic switching of the resistive memory elements. Steps S20 and S30 will typically be performed in a continual manner, so as to repeatedly update values stored in the array 10, if needed.

Upon receiving S40 a cryptographic request from an external computer, the threshold levels of the sense amplifiers composing the readout circuitry 15 are adjusted S50 by the control unit 14, if necessary, with a view to performing logical operations involved in a cryptographic procedure. Next, at least two input lines are selected by the selection unit 11, including one of the K input lines and one of the/input lines. Read signals are then applied S60 to the selected input lines. Output signals are read out S70 by the readout circuitry 15, which concurrently performs S80 a transformation of the data being read out, with the help of the control unit 14. Steps S70 and S80 are concomitantly performed, notwithstanding the apparent order of steps S70, S80 shown in the flow of FIG. 6.

This transformation involves logical operations (e.g., bitwise XOR operations), which are performed in-memory, thanks to the readout circuitry 15. Further cryptographic operations are next performed S90 in the NMC unit 16 (e.g., cyclic shifting operations). In the example of FIG. 6, steps S80 and S90 iterate (S95: No) in a loop aiming at completing a cryptographic procedure such as an AES procedure. Upon completion (S95: Yes) of the cryptographic procedure, response data (e.g., a cryptographic object) are obtained S100, which are then transferred S110 to the requesting computer or another computer. This process repeats as necessary to serve external requests.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other memory elements than those explicitly listed may possibly be used in the array 10.

What is claimed is:

1. A computer-implemented method of processing data in-memory comprising:
    providing a memory device having a crossbar array structure including N input lines and M output lines, arranged in N rows and M columns, which are interconnected at cross-points defining N×M cells, wherein the cells include respective memory elements, whereby the crossbar array structure includes a set of N×M memory elements, which decomposes into a first subset of K×M memory elements and a second subset of L×M memory elements, in accordance with a first subset of K rows and a second subset of L rows of the N rows, respectively, where N≥2, M≥2, 1≤L<M, and K+L=N, and
    target data are stored across the first subset of K×M memory elements, whereas operand data are stored across the second subset of L×M memory elements;
    applying electrical signals to at least two input lines corresponding to at least two rows, the latter including at least one of the K rows and at least one of the L rows, to obtain output signals in output of the M output lines, the output signals depending on target values and operand values, in accordance with data stored across said at least two rows; and
    while reading out the output signals, performing a transformation operation, in-memory, on the target values corresponding to data stored in at least one of the subsets of K rows based on the operand values corresponding to data stored in at least one of the subsets of L rows, to obtain transformed data.

2. The computer-implemented method of claim 1, wherein:
    the memory device comprises a readout circuitry in output of the output lines,
    the output signals are read out by the readout circuitry and the transformation operation is concurrently performed at the readout circuitry, while reading out the output signals, and
    the respective memory elements are resistive memory elements.

3. The computer-implemented method of claim 2, wherein:
    the readout circuitry comprises an array of sense amplifiers with adjustable input threshold levels, wherein each sense amplifier of the array is connected in output of a respective one of the output lines,
    said transformation operation involves logical operations, and
    the method further comprises adjusting the input threshold levels of the sense amplifiers for the latter to implement the logical operations.

4. The computer-implemented method of claim 3, wherein:
the operand data encode a cryptographic key, whereby the operand values are cryptographic values, and
the transformation operation is a cryptographic operation, which is based on the cryptographic key.

5. The computer-implemented method of claim 4, wherein:
each of the logical operations includes one of an XOR operation, a logical AND operation, and a logical OR operation.

6. The computer-implemented method of claim 5, wherein:
each of the logical operations consists of a bitwise XOR operation based on respective one of the target values and a corresponding one of the cryptographic values.

7. The computer-implemented method of claim 5, wherein:
the method further comprises performing one or more further operations based on the transformed data, thanks to a near-memory computation unit connected in output of the readout circuitry.

8. The computer-implemented method of claim 7, wherein:
one of the one or more further operations includes a cyclic shifting operation performed thanks to the near-memory computation unit to obtain cyclically shift data.

9. The computer-implemented method of claim 7, wherein:
the further operations are performed as part of a cryptographic procedure, which involve multiple iterations between the readout circuitry and the near-memory computation unit.

10. The computer-implemented method of claim 9, wherein:
each of the multiple iterations between the readout circuitry and the near-memory computation unit of the cryptographic procedure involves an XOR operation performed thanks to the readout circuitry, followed by a cyclic shifting operation performed thanks to the near-memory computation unit, and wherein the cryptographic procedure is an advanced encryption standard procedure.

11. The computer-implemented method of claim 1, wherein the method further comprises:
receiving, prior to applying said electrical signals, a request from an external computer system, whereby said electrical signals are applied in response to and in accordance with the request received;
producing data based on the transformed data accordingly obtained; and
forwarding the produced data to the external computer system.

12. The computer-implemented method of claim 1, wherein:
the method further comprises, prior to applying said electrical signals to the at least two input lines, applying electrical writing signals to at least one of the input lines corresponding to the L rows to write the operand data across the corresponding memory elements, wherein:
the operand data are cryptographic data encoding a cryptographic key, and
one or more electrical properties of the initial electrical signals applied are adjusted so as to achieve a stochastic switching of memristors of the corresponding memory elements, whereby only a fraction of the memristors switches to a given resistive state, whereas a complementary fraction of the memristors remain in an unchanged resistive state.

13. A computer-implemented method comprising:
applying electrical signals to a memory device having a crossbar array structure having input and outlines interconnected at cross-points to at least two input lines corresponding to at least two rows, to obtain output signals wherein the output signals depend on target values and operand values, in accordance with data stored across said at least two rows; and
while reading out the output signals, performing a transformation operation, in-memory, on the target values based on the operand values, to obtain transformed data.

14. The computer-implemented method of claim 13, further comprising:
adjusting threshold levels of sense amplifiers of a readout circuitry to implement logical operations; and
performing one or more further operations based on transformed data, thanks to a near-memory computation unit connected in output of the readout circuitry.

15. The computer-implemented method of claim 13, further comprising:
receiving, prior to applying said electrical signals, a request from an external computer system, whereby said electrical signals are applied in response to and in accordance with the request received;
producing data based on the transformed data accordingly obtained; and
forwarding the produced data to the external computer system.

16. A memory apparatus for processing data in-memory comprising:
a crossbar array structure including N input lines and M output lines, arranged in N rows and M columns, which are interconnected at cross-points defining N×M cells, wherein the cells include respective memory elements that are resistive memory elements, whereby the crossbar array structure includes a set of N×M memory elements, which decompose into a first subset of K×M memory elements for storing target data and a second subset of L×M memory elements for storing operand data, in accordance with a first subset of K rows and a second subset of L rows of the N rows, respectively, where N≥2, M≥2, 1≤L<M, and K+L=N;
a selection circuit operably connected to the output lines and configured to select at least two rows including at least one of the K rows and at least one of the L rows;
an electrical input unit operably connected to the input lines and configured to apply electrical signals to at least two input lines corresponding to at least two rows, as selected by the selection circuit, in operation, to obtain output signals in output of the M output lines, wherein, in operation, the obtained output signals depend on target values and operand values, in accordance with data stored across said at least two rows; and
a readout circuitry, which is connected to the output lines and is configured to read out the obtained output signals and concurrently perform a transformation operation, in-memory, on the target values based on the operand values, to obtain transformed data.

17. The memory apparatus according to claim 16, wherein:
the memory apparatus further comprises a near-memory computation unit connected to the readout circuitry,
the respective memory elements are resistive memory elements,
the operand data encode cryptographic keys, and
the electrical input unit and the readout circuitry are jointly configured to prevent reading out any of the cryptographic keys in plain.

18. The memory apparatus according to claim 17, wherein:
the readout circuitry comprises an array of sense amplifiers with adjustable threshold levels, wherein each sense amplifier of the array is connected in output of a respective one of the output lines, and
the memory apparatus further comprises a control unit connected to each of the sense amplifiers, wherein the control unit includes program instructions stored on one or more computer readable storage media to adjust the threshold levels of the sense amplifiers, so as for the readout circuitry to be able to implement logical operations involved in said transformation operation.

19. A computer program product comprising:
one or more computer readable storage media and program instructions stored on the one or more computer readable storage media, the program instructions comprising:
program instructions to apply electrical signals to a memory device having a crossbar array structure having input and outlines interconnected at crosspoints to at least two input lines corresponding to at least two rows, to obtain output signals wherein the output signals depend on target values and operand values, in accordance with data stored across said at least two rows; and
program instructions to, while reading out the output signals, performing a transformation operation, in-memory, on the target values based on the operand values, to obtain transformed data.

20. The computer program product of claim 19, wherein the program instructions stored on the one or more computer readable storage medium further comprise:
program instructions to adjust threshold levels of sense amplifiers of a readout circuitry to implement logical operations; and
program instructions to perform one or more further operations based on transformed data, thanks to a near-memory computation unit connected in output of the readout circuitry.

21. A computerized system including:
one or more memory apparatuses, wherein each of the one or more memory apparatuses includes one or more computer readable storage media and program instructions stored on the one or more computer readable storage media, wherein the program instructions comprise performing a transformation operation; and
a service unit connected to each memory apparatus of the one or more memory apparatuses that includes program instructions to offload transformation operations to each of the one or more memory apparatuses; and
a control unit containing program instructions stored on one or more computer readable storage media, wherein the program instructions adjust threshold levels of sense amplifiers of a readout circuitry of a respective memory apparatus to implement logical operations on the offloaded transformation operations.

22. The computerized system according to claim 21, wherein
at least one of the one or more memory apparatuses further comprises a near-memory computation unit connected to its readout circuitry.

23. The computerized system according to claim 21, wherein
the readout circuitry of each of the one or more memory apparatuses comprises an array of sense amplifiers with adjustable threshold levels, wherein each sense amplifier of the array is connected in output of a respective one of the output lines, and
each of the one or more memory apparatuses further comprises a control unit connected to each of its sense amplifiers, wherein the control unit includes program instructions stored on one or more computer readable storage media to adjust the threshold levels of its sense amplifiers, so as for its readout circuitry to be able to implement logical operations involved in said transformation operation.

24. The computerized system according to claim 21, wherein
the computerized system is a cryptographic service system,
the operand data stored in each of the one or more memory apparatuses encode cryptographic keys, whereby each of said apparatuses is adapted to perform said transformation operation as a cryptographic operation, and
the service unit is connected to each of the one or more memory apparatuses and configured to offload cryptographic operations to any of the one or more memory apparatuses.

25. The computerized system according to claim 24, wherein
the electrical input unit and the readout circuitry of each of the one or more memory apparatuses are jointly configured to prevent reading out any of the cryptographic keys stored therein in plain.

* * * * *